United States Patent [19]
Wu et al.

[11] Patent Number: 5,549,224
[45] Date of Patent: Aug. 27, 1996

[54] LIQUID MEDICINE CONTAINER STRUCTURE

[76] Inventors: Ko-hsiang Wu, No. 94, Lung Sho Steet 12 Lin, Lung Hsiang Li; Wei-hsing Huang, No. 2, Lane 60, Sho Fa Road, 6 Lin, Chung Cheng Li, both of Tao Yuen, Taiwan

[21] Appl. No.: 408,735

[22] Filed: Mar. 22, 1995

[51] Int. Cl.⁶ ....................................................... B67D 5/38
[52] U.S. Cl. ........................... 222/158; 222/205; 222/207; 222/442; 222/568
[58] Field of Search ..................................... 222/158, 205, 222/207, 442, 494, 568

[56] References Cited

U.S. PATENT DOCUMENTS

| | | | |
|---|---|---|---|
| 2,219,146 | 10/1940 | Zeugner | 222/158 X |
| 2,985,343 | 5/1961 | Mask | 222/442 |
| 3,033,420 | 5/1962 | Thomas et al. | 222/158 X |
| 4,105,142 | 8/1978 | Morris, Jr. | 222/158 |
| 4,474,312 | 10/1984 | Donoghue | 222/205 |
| 4,776,495 | 10/1988 | Vignot | 222/494 X |
| 4,875,603 | 10/1989 | Weinstein | 222/205 |
| 5,292,039 | 3/1994 | NeofitouG330109 | 222/158 X |
| 5,330,081 | 7/1994 | Davenport | 222/207 |

FOREIGN PATENT DOCUMENTS 2048827  12/1980  United Kingdom ................... 222/494

*Primary Examiner*—Joseph A. Kaufman
*Attorney, Agent, or Firm*—Jason Z. Lin

[57] ABSTRACT

A liquid medicine container includes a container body having threaded neck with an opening formed thereon for the entry of a liquid medicine into the container body. A seal member is fit into the opening to seal it. A through hole is formed on the seal member to be in fluid communication with the interior of the container body. The neck has a circumferential flange formed thereon with two recesses formed on the flange. The neck also has a groove formed thereon and extending in a direction substantially normal to the threading of the neck from a point close the circumferential flange, crossing the neck threading, to a point close to the opening. A cap member has an open end with segmented threading formed therein to be engageable with the neck threading for tightening the cap member on the neck wherein the edge of the open end of the cap member is in contact engagement with the flange and two bosses formed on the edge of the open end of the cap member received within the recesses formed on the flange. The groove formed on the neck serves as an air path when the cap member is turned to have the bosses slight away from the recesses.

11 Claims, 4 Drawing Sheets

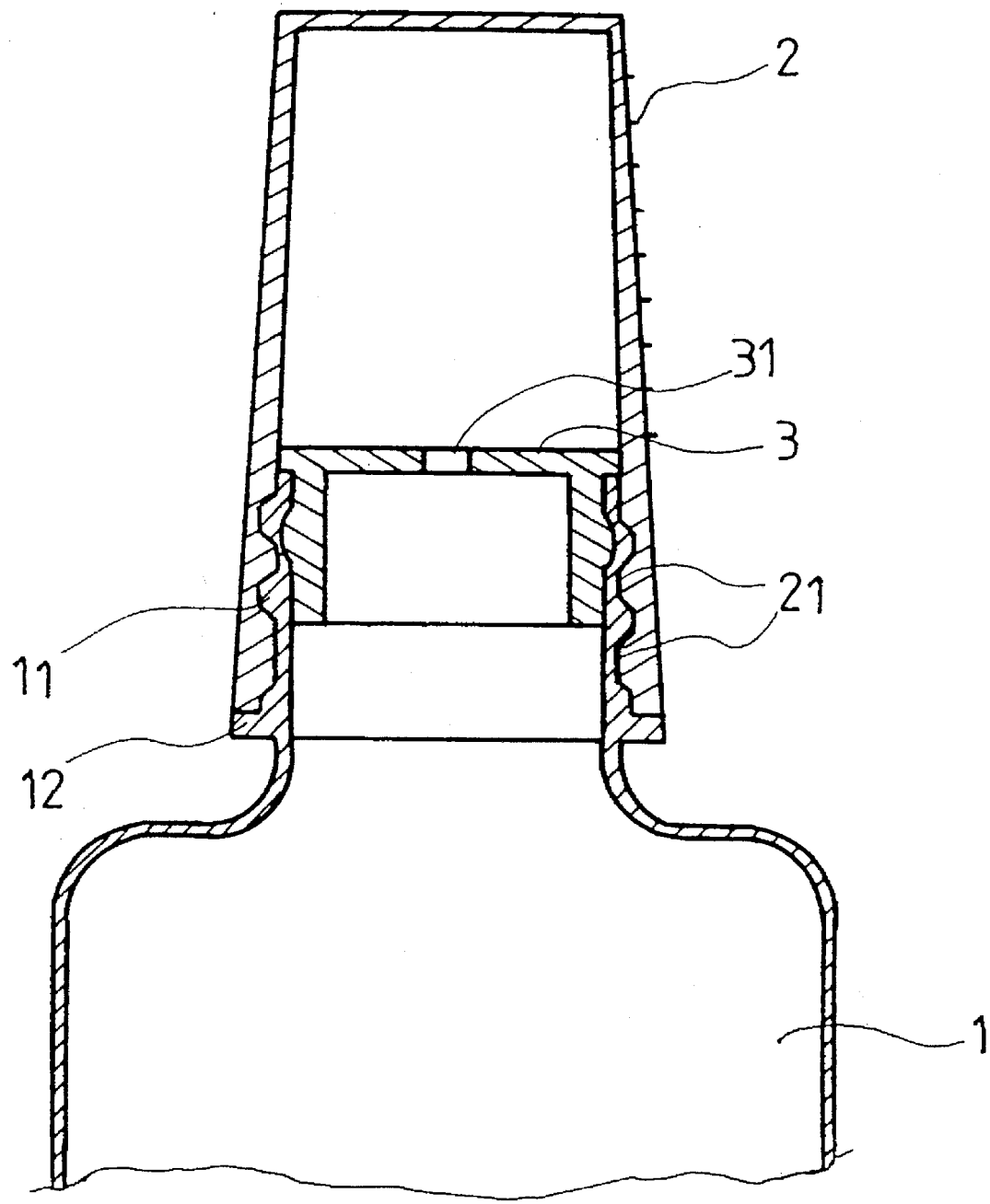
F I G. 2

LIQUID MEDICINE CONTAINER STRUCTURE

FIELD OF THE INVENTION

The present invention relates to a liquid medicine container and in particular to a liquid medicine container having a dose measuring cap mounted thereon.

BACKGROUND OF THE INVENTION

Medicines in the form of water solution or mixed within water or other liquid materials are usually contained in a bottle. The bottle is closed by a cap which has in general only the function of sealing the bottle opening. To serve, the cap has to be open and a measuring cup has to be used to pour therein a dose or a desired amount of medicine. The measuring cup is in general separate from the medicine bottle and thus causes certain inconvenience in use.

Further, in pouring the medicine from the bottle into the measuring cup, it requires skill, otherwise it may splash the medicine outside the measuring cup, especially when doing so in a moving vehicle.

Besides, the bottle cap is usually provided with an inner threading to tighten on a threaded neck of the medicine bottle. Such a threading usually causes medicine residual left between turns of the threading.

It is therefore desirable to provide a liquid medicine container which overcomes the drawbacks of the prior art medicine bottles.

SUMMARY OF THE INVENTION

A primary object of the present invention is to provide a liquid medicine container having a measuring cup mounted on the threaded neck of the container and a seal member substantially fit into and thus close the opening of the container with a hole extending therethrough so as to allow the medicine contained within the container to directly flow into the measuring cup by squeezing the container to eliminate the splash problem.

Another object of the present invention is to provide a cap member for threadingly engaging the threaded neck of the medicine container wherein the cap member comprises sparsely-distributed segments of a threading to replace a full threading conventionally used to engage the threaded neck so as to reduce the possible residual of the medicine within the threading.

To achieve the above objects, there is provided a liquid medicine container comprising a container body having threaded neck with an opening formed thereon for the entry of a liquid medicine into the container body. A seal member is fit into the opening to seal it. A through hole is formed on the seal member to be in fluid communication with the interior of the container body. The neck has a circumferential flange formed thereon with two recesses formed on the flange. The neck also has a groove formed thereon and extending in a direction substantially normal to the threading of the neck from a point close the circumferential flange, crossing the neck threading, to a point close to the opening. A cap member has an open end with segmented threading formed therein to be engageable with the neck threading for tightening the cap member on the neck wherein the edge of the open end of the cap member is in contact engagement with the flange and two bosses formed on the edge of the open end of the cap member received within the recesses formed on the flange. The groove formed on the neck serves as an air path when the cap member is turned to have the bosses slight away from the recesses.

BRIEF DESCRIPTION OF THE DRAWINGS

The present invention will be better understood from the following description of a preferred embodiment thereof, with reference to the attached drawings, wherein:

FIG. 2 is a cross-sectional view showing the liquid medicine container of the present invention with the cap member tightened on the threaded neck of the container;

DETAILED DESCRIPTION OF THE PREFERRED EMBODIMENT

Figure 1:
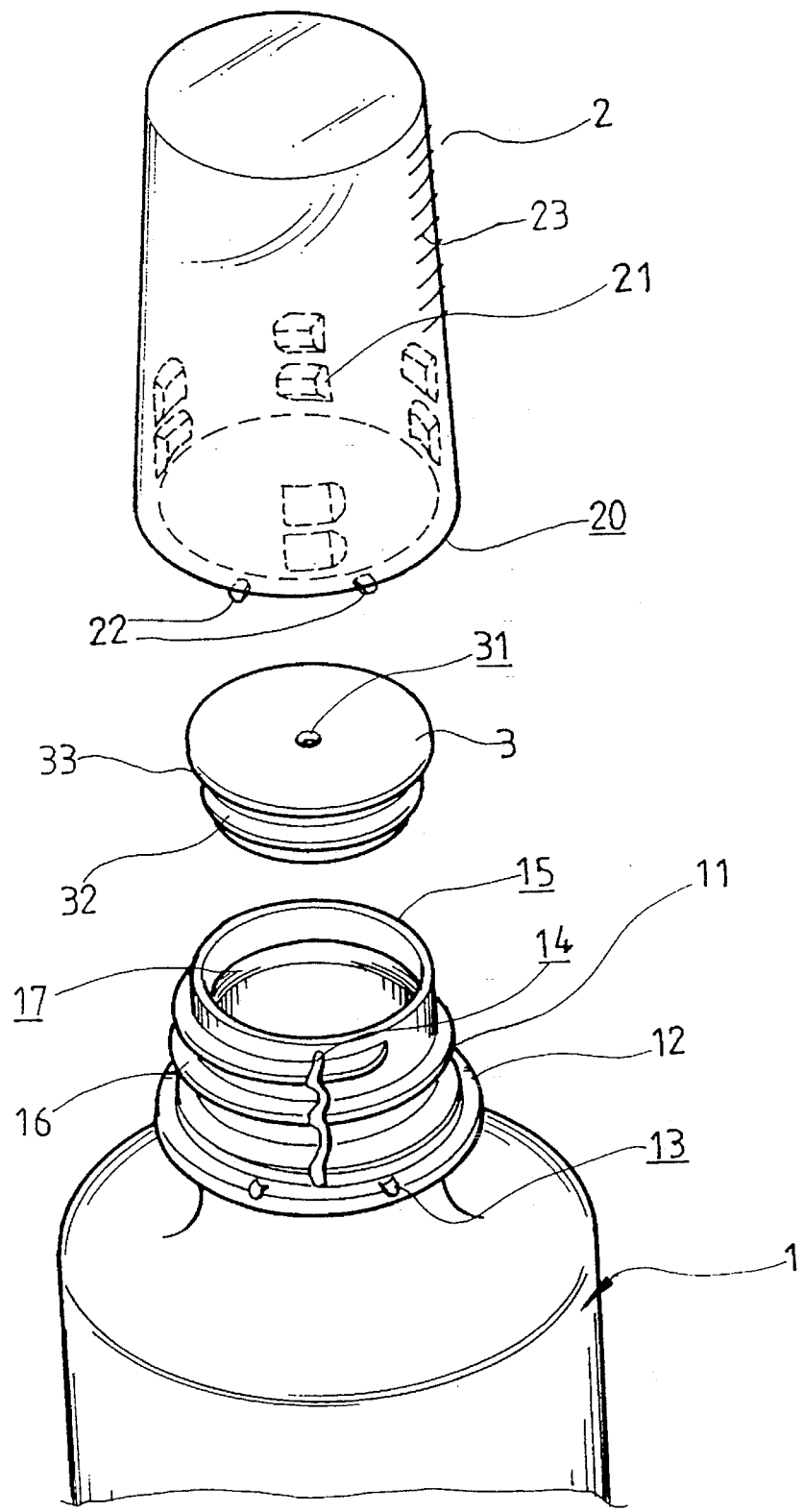
FIG. 1 is an exploded perspective view showing a liquid medicine container constructed in accordance with the present invention.

With reference to the drawings and in particular to FIGS. 1 and 2, wherein a liquid medicine container constructed in accordance with the present invention is shown, the liquid medicine container of the present invention comprises a container body 1 made of a resilient material, such as plastics, to allow the container body 1 to be squeezable. For simplicity, in FIGS. 1–4, the container body 1 has only the upper portion shown and the lower portion thereof is eliminated from the drawings for it contains no improvement over the prior art medicine bottle. However, a complete container body 1 is shown in FIG. 5.

The container body 1 comprises a neck 11 on which an opening 15 is formed for the entry of a liquid medicine into an interior space of the container body 1. The neck 11 has a circumferential flange 12 formed thereon, substantially located at the connection between the container body 1 and the neck 11. The circumferential flange 12 has two recesses 13 formed thereon and substantially spaced from each other. The neck 11 comprises a threading 16 formed thereon, located between the flange 12 and the opening 15. A groove 14 is formed on the neck 11 and extends in a direction substantially normal to the threading from a point close to the circumferential flange 12, crossing the threading 16, to a point above the threading 16 and close to the opening 15.

A seal member 3, preferably made of a resilient material, such as rubber, has a configuration capable to fit into and thus seal or close the opening 15. To securely fix the seal member 3 within the opening 15, preferably, the seal member 3 has a circumferential flange 32 receivable within a circumferential groove 17 formed inside the opening 15. The seal member 3 may also be provided with a top flange 33 to rest on the edge of the opening 15, as is conventionally known.

The seal member 3 has formed thereon a through hole 31 which is in fluid communication with the interior of the container body 1. Due to the resilience of the material used to make the seal member 3, the through hole 31 may be blocked by the deformation of the seal member material when the seal member 3 is force-fit into the opening 15 of the container body 1. However, when the container body 1 is squeezed, the interior pressure inside the container body 1 is increased so as to force the blocked hole 31 to open to allow liquid medicine contained within the container body 1 to flow therethrough.

A cap member 2 has an interior space for receiving the liquid medicine from the container body 1, having an open end 20 configured to fit over the neck 11 of the container body 1. A plurality of projections 21 are formed inside the open end 20 of the cap member 2 along a helix path that has a pitch corresponding to and thus is engageable with the threading 16 of the neck 11 of the container body 1 so as to allow the cap member 2 to be threadingly engageable with the neck 11. In this respect, the projections may be sparsely-distributed segments of an imaginary threading along the helix path. The threading engagement between the cap member 2 and the neck 11 of the container body 1 is limited by the circumferential flange 12 which stops further movement of the cap member 2 relative to the neck 11 when the edge of the open end 20 of the cap member 2 is brought into contact with the circumferential flange 12.

Figure 3:
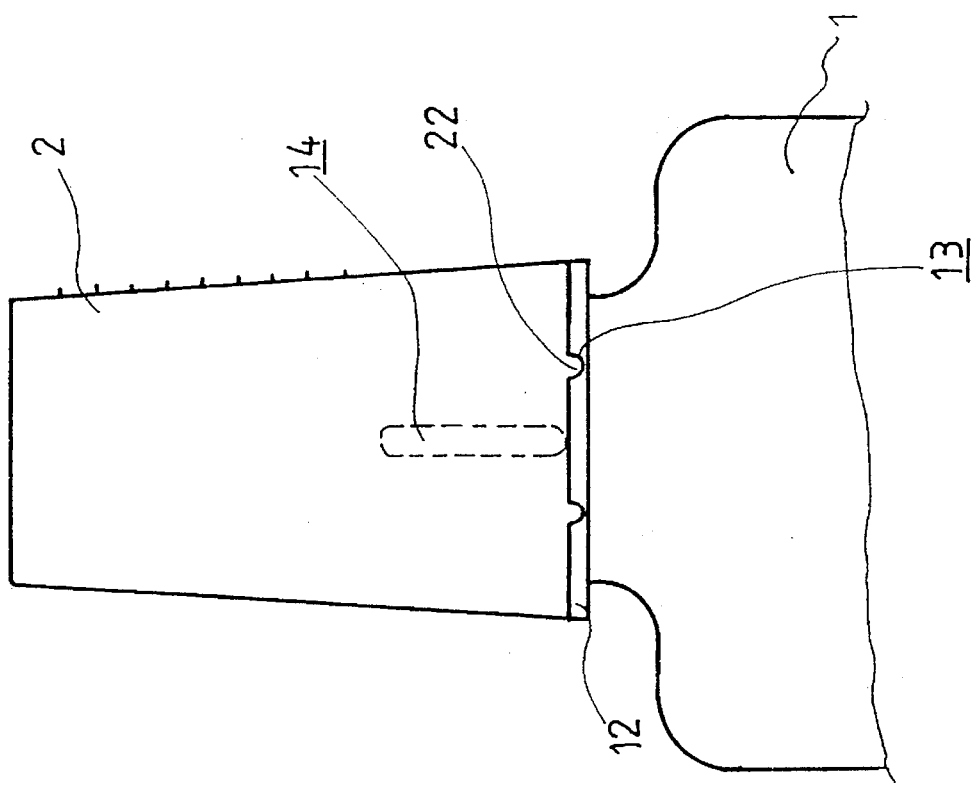
FIG. 3 is a side elevational view of the liquid medicine container of the present invention showing the cap member tightened on the container.

The open end 20 of the cap member 2 has two bosses 22 formed on the edge thereof to be corresponding to the two recesses 13 formed on the circumferential flange 12 so as to serve as positioning means for the cap member 2 to be tightened on the neck 11 in that when the cap member 2 is tightened on the neck 11, the bosses 22 are received within the recesses 13, as particularly shown in FIG. 3.

Similar to a conventional medicine measuring cup, marks or dials 23 may be provided on the cap member 2 for measurement purpose.

Figure 4:
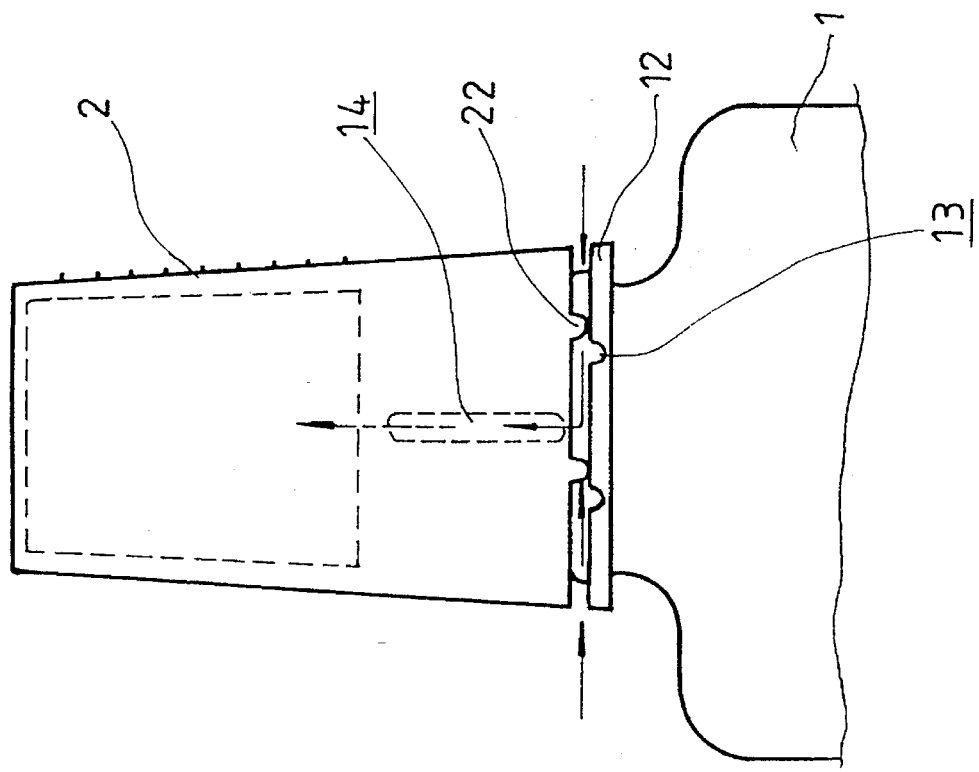
FIG. 4 is also a side elevational of the liquid medicine container of the present invention showing the cap member partially loosened to allow air to flow into the cap.
Figure 5:
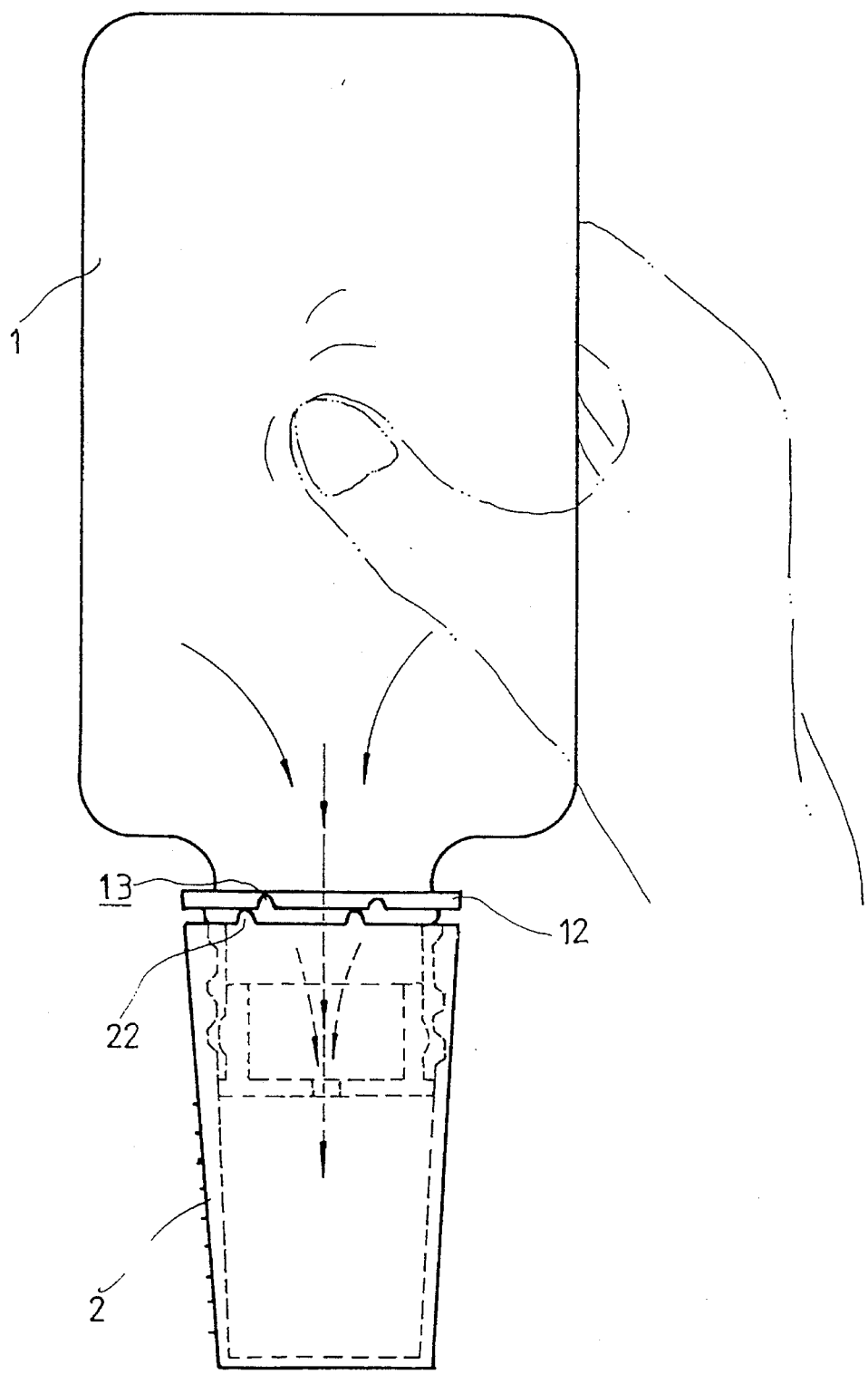
FIG. 5 is a side elevational view showing how to use the liquid medicine container constructed in accordance with the present invention.

In use, the user has to turn the cap member 2 relative to the container body 1 slightly away from the tightened position where the bosses 22 are received within the recesses 13 to move the bosses 22 out of the recesses 13, as shown in FIG. 4. Under this situation, an air path is formed between the edge of the open end 20 of the cap member 2 and the circumferential flange 12. The air path is continued by the groove 14 to extend into the cap member 2. The air path in indicated by arrows illustrated in FIG. 4. The air path serves to balance the pressure inside the cap member so as to enhance the pouring of medicine from the container body 1 into the cap member 2.

With such an air path, when the user turns the medicine container of the present invention up side down as shown in FIG. 5 and squeeze the container body 1, liquid medicine contained within the container body 1 is forced to flow into the cap member 2 through the hole 31 of the seal member 3, as indicated by the arrows of FIG. 5, with the air inside the cap member 2 being forced to flow out thereof through the air path defined by the groove 14.

An over-squeeze of the container body 1 which causes an amount of liquid medicine greater than desired to flow into the cap member 2 can be corrected by turning the liquid medicine container back to normal position and releasing the container body 1 to allow the liquid medicine within the cap member 2 to be sucked back into the container body 1. Under this situation, air flows along the air path back into the cap member 2 to balance the pressure difference.

The use of segmented threading 21 to replace complete threading conventionally used helps to reduce the amount of liquid medicine residual left within the threading.

Although a preferred embodiment have been described to illustrate the present invention, it is apparent that changes and modifications in the specifically described embodiment can be carried out without departing from the scope of the invention which is intended to be limited only by the appended claims.

What is claimed is:

1. A liquid medicine container comprising:
   a squeezable container body having a neck with an opening for the entry of a liquid medicine into an interior space of said container body;
   a seal member being fit into and thus closing said opening of said container body, said seal member having a through hole formed thereon to be in fluid communication with said interior space of said container body;
   a cap member having an interior space with an open end liquid-tightly releasably engageable with said neck of said container body to be in fluid communication with said interior space of said container body through said hole formed on said seal member; and
   pressure balance means being provided to balance interior pressure inside said cap member when said container body is squeezed to force said liquid medicine contained therein to flow into said interior space of said cap member, said pressure balance means comprising a groove formed on said neck of said container body extending from a point located outside said cap member when said cap member is fit on said neck to a point close to said opening of said container body to allow air to flow in and out of said interior space of said cap member.

2. The liquid medicine container as claimed in claim 1, wherein the neck of the container body comprises a threading formed thereon and the cap member is threadingly engageable on the threaded neck of the container body.

3. The liquid medicine container as claimed in claim 2, wherein the cap member comprises a plurality of projections formed inside the open end thereof, the projections being substantially spaced from each other along a helix path which has a pitch corresponding to and engageable with the neck threading.

4. The liquid medicine container as claimed in claim 1, wherein the cap member has marks formed thereon for measurement purpose.

5. A liquid medicine container comprising:
   a squeezable container body having a neck with an opening for the entry of a liquid medicine into an interior space of said container body;
   a seal member being fit into and thus closing said opening of said container body, said seal member having a through hole formed thereon to be in fluid communication with said interior space of said container body;
   a cap member having an interior space with an open end liquid-tightly releasably engageable with said neck of said container body to be in fluid communication with said interior space of said container body through said hole formed on said seal member, said neck of said container body comprising a circumferential flange formed thereon to serve as a stop of the fitting movement of said cap member onto said neck, said circumferential flange having at least one recess formed thereon and said open end of said cap member having at least one boss formed on an edge thereof for being receivable within said recess when said cap member is fit onto said neck to have said edge of said open end of said cap member in contact engagement with said circumferential flange; and
   pressure balance means being provided to balance interior pressure inside said cap member when said container body is squeezed to force said liquid medicine contained therein to flow into said interior space of said cap member, said pressure balance means comprising a groove formed on said neck of said container body extending from a point close to said circumferential flange to a point close to said opening of said container body so that a gap is formed between said edge of said open end of said cap member and said circumferential flange of said neck by moving said cap member relative to said container body to allow air to flow in and out of said interior space of said cap member through said groove.

6. The liquid medicine container as claimed in claim 5, wherein the circumferential flange of the neck has two recesses formed thereon and wherein the edge of the open end of the cap member has two corresponding bosses formed thereon to be respectively receivable within the recesses formed on the circumferential flange.

7. A liquid medicine container comprising a container body made of a material to be squeezable and having a threaded neck with an opening for the entry of a liquid medicine into an interior space of the container body, the threaded neck having a circumferential flange located below the neck threading and a groove extending along a direction substantially normal to the neck threading from a point close to the circumferential flange, crossing the neck threading, to a point close to the opening, a seal member fit into and thus closing the opening of the container body and having a through hole formed thereon to be in fluid communication with the interior space of the container body and a cap member having an open end threadingly engageable with the threaded neck of the container body to fit thereon, the groove that is formed on the threaded neck serving as an air passage communicating an interior space of the cap member.

8. The liquid medicine container as claimed in claim 7, wherein the circumferential flange of the threaded neck has at least one recess formed thereon and wherein the open end of the cap member has at least one boss formed on an edge thereof to be receivable within the recess when the cap member is fit onto the neck to have the edge of the open end of the cap member in contact engagement with the circumferential flange of the neck.

9. The liquid medicine container as claimed in claim 8, wherein the circumferential flange of the threaded neck has two recesses formed thereon and wherein the edge of the open end of the cap member has two corresponding bosses formed thereon to be respectively receivable within the recesses formed on the circumferential flange of the neck.

10. The liquid medicine container as claimed in claim 7, wherein the cap member comprises a plurality of projections formed inside the open end thereof, the projections being substantially spaced from each other along a helix path which has a pitch corresponding to and engageable with the neck threading.

11. The liquid medicine container as claimed in claim 7, wherein the cap member has marks formed thereon for measurement purpose.

* * * * *